March 28, 1939.  W. BRAUER  2,151,892
BRAKE
Filed Aug. 6, 1936  2 Sheets-Sheet 1

Inventor
Walter Brauer
By Edward V. Hardway
Attorney

March 28, 1939.  W. BRAUER  2,151,892
BRAKE
Filed Aug. 6, 1936  2 Sheets-Sheet 2

Inventor
Walter Brauer
By Edward V. Hanbury
Attorney

Patented Mar. 28, 1939

2,151,892

UNITED STATES PATENT OFFICE 2,151,892

BRAKE

Walter Brauer, Oklahoma City, Okla.

Application August 6, 1936, Serial No. 94,535

2 Claims. (Cl. 188—151)

This invention relates to brakes, and has more particular relation to the operating mechanism therefor.

It is an object of the invention to provide novel means for setting and releasing the brake band wherein the friction of the rotating drum with the band will aid in setting the brake.

It is another object of the invention to provide novel operating means for operating the brake band, embodying fluid pressure cylinders with pistons therein connected to the respective ends of the band with a by-pass for connecting the cylinders and manually operable means connected with one of the pistons through the manipulation of which the brake is operated.

The invention also embodies a novel type of brake band operating mechanism to which the respective ends of the band are connected with manually operable means for applying the brake band to the brake drum, the construction being such that the friction of the drum with the band will assist in setting the brake and in equalizing the braking action throughout the friction area of the band.

With the above and other objects in view, the invention has particular relation to certain novel features of construction, operation and arrangement of parts, an example of which is given in this specification and illustrated in the accompanying drawings, wherein.

Figure 1:
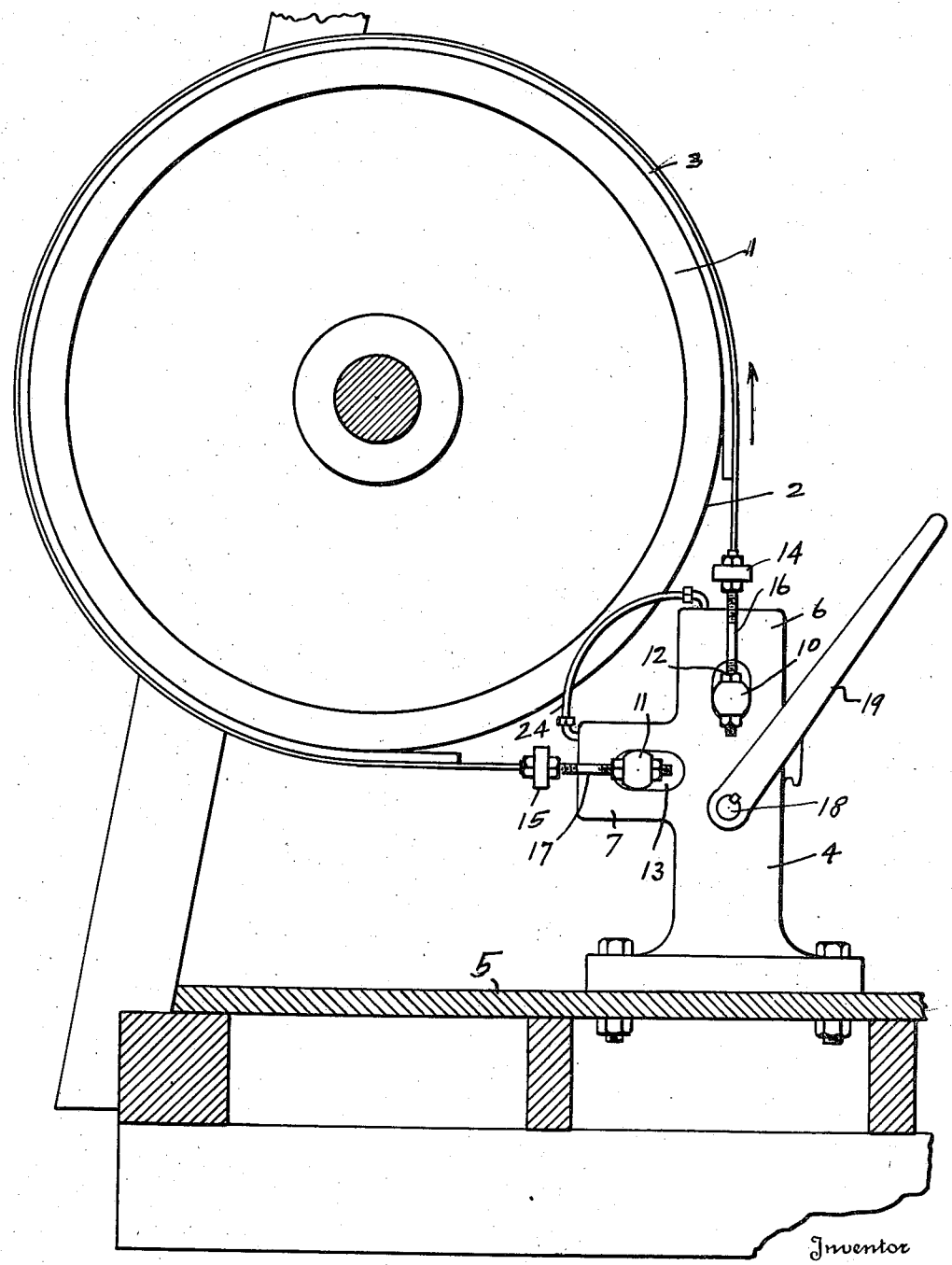
Figure 1 shows an end view of the brake drum showing the band operating mechanism.
Figures 2, 3:
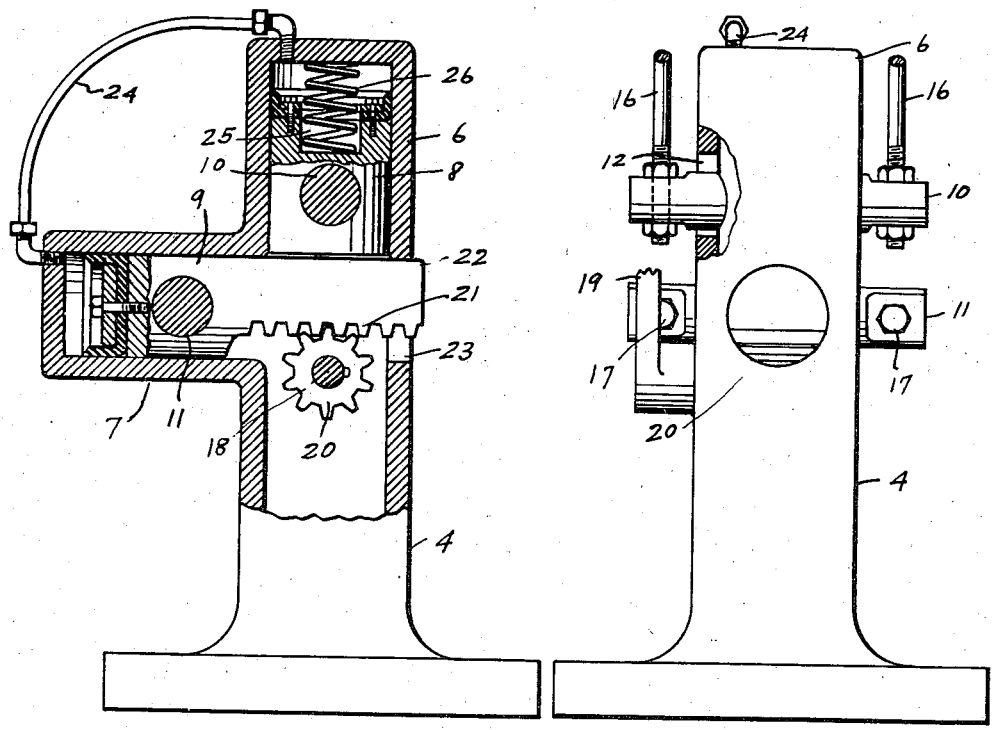
Figure 2 shows a vertical sectional view of said mechanism.
Figure 3 shows a front elevation thereof, partly in section.

Referring now more particularly to the drawings wherein like numerals of reference designate similar parts in each of the figures, the numeral 1 designates the brake drum having the brake surface 2 around which the brank band 3 operates. The numeral 4 designates a stand which may be mounted on a derrick floor 5 or other support. The stand is formed with the upright cylinder 6 and the horizontal cylinder 7, the latter of which is of less cross sectional area than the former, and in which the respective pistons 8 and 9 are fitted. These cylinders are equipped with corresponding cross heads 10 and 11 which extend out each way beyond the stand 4 and work in the oblong bearings 12 and 13. Attached to the ends of the brake band 3 are the respective yokes 14, 15 and the ends of these yokes are connected to the corresponding cross heads 10 and 11 by the side rods 16, 16 and 17, 17.

There is a transverse shaft 18 mounted in suitable bearings in the stand 4 and fixed to one end of which there is an operating lever 19. Fixed on the shaft 18 within the stand 4 there is the spur gear 20 which is in mesh with the rack face 21 of the rack member 22 which extends across the stand and is formed integrally with the piston 9. This rack member works through a suitable opening 23 in the forward side of the stand 4.

The outer ends of the cylinders 6, 7 are closed and are connected by a by-pass pipe 24. The chambers between the pistons and the outer end of the cylinders and the by-pass pipe 24 are filled with a suitable operating fluid such as oil. In operation upon depression of the lever 19 the piston 9 will be retracted, operating through side rods 17 to set the brake band. The drum 1, turning in the direction indicated by the arrow in Figure 4, will, by its friction on the band 3, exert a pull through the side rods 16 in the direction of rotation. The piston 8 will be moved upwardly thereby displacing operating fluid from cylinder 6 into cylinder 7. To permit such displacement the piston 9 will move further than piston 8 exerting an additional pull through the side rods 17 and operating to further contract said band and to equalize the friction of the band with the drum all the way around. The brake therefore will be very easy to operate. In most cases it will be merely necessary for the operator to depress the lever 19 to bring the band into frictional contact with the drum and thereafter the band will operate substantially automatically to effect further contraction of the band and an effective setting of the brake.

The outer end of the plunger 8 has a deep socket 25 in which the coil spring 26 is seated, the outer end of said spring resting against the outer end of the cylinder 6. Upon release of the lever 19 this spring will retract the piston 8 to permit equalization of the liquid in the cylinders 6 and 7.

The drawings and description disclose what is now considered to be a preferred form of the invention by way of illustration only while the broad principle of the invention will be defined by the appended claims.

What I claim is:

1. Brake mechanism comprising a rotatable brake drum, a brake band around the drum, a cylinder in alignment with one end of the band, a cylinder in alignment with the other end of the band, said cylinders being of different cross-sectional areas, pistons fitted into the cylinders and connected to the respective ends of the band in alignment therewith and inclosing pressure chambers, means for actuating the piston of the smaller cross sectional area to in turn actuate the band into frictional engagement with the drum, the other end of the band being arranged, upon such actuation, to actuate the piston of larger cross-sectional area, a by-pass conduit connecting said chambers through which the liquid will be forced, upon actuation of the last mentioned piston, to increase the pressure against the piston having the smaller area whereby the band will be further actuated to increase its frictional engagement with the drum.

2. Brake mechanism comprising a rotatable brake drum, a brake band around the drum, a cylinder unit comprising a stand formed with an upright cylinder in alignment with one end of the band and an approximately horizontal cylinder in alignment with the other end of the band, said cylinders being of different cross-sectional areas, pistons fitted into the cylinders and connected to the respective ends of the band in alignment therewith and enclosing pressure chambers, a rack member on the cylinder of the smaller cross-sectional area and extending across the stand, a spur gear within the stand in mesh with said rack member, means accessible to an operator for rotating the spur gear to actuate the piston of the smaller cross-sectional area to in turn actuate the band into frictional engagement with the drum, the other end of the band being arranged, upon such actuation, to actuate the piston of the larger cross-sectional area, a by-pass conduit connecting said chambers through which liquid will be forced, upon actuation of the last mentioned piston, to increase the pressure against the piston having the smaller area whereby the band will be further actuated to increase its frictional engagement with the drum.

WALTER BRAUER.